UNITED STATES PATENT OFFICE.

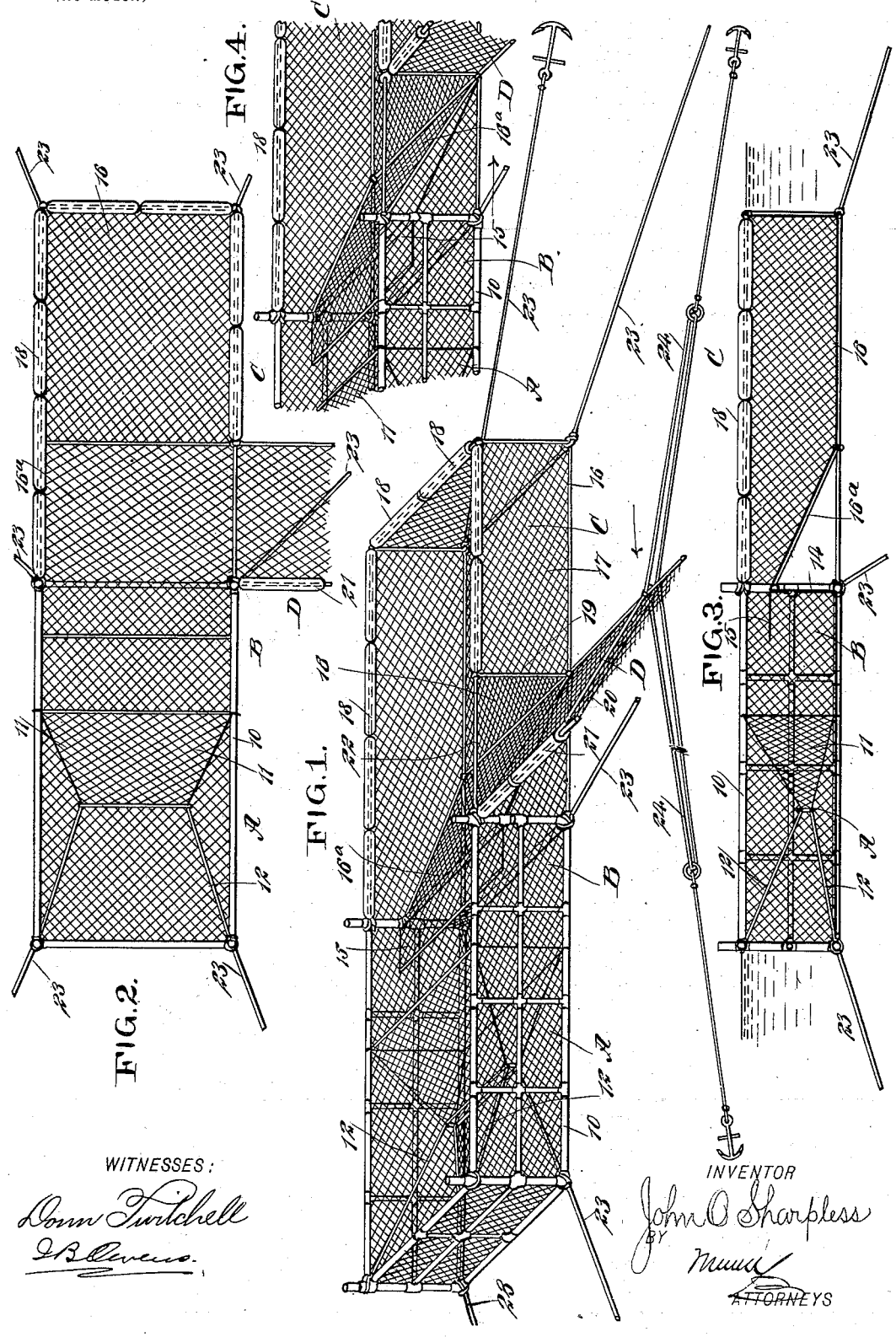

JOHN O. SHARPLESS, OF FAIRHAVEN, WASHINGTON.

FISH-TRAP.

SPECIFICATION forming part of Letters Patent No. 657,460, dated September 4, 1900.

Application filed March 22, 1900. Serial No. 9,767. (No model.)

*To all whom it may concern:*

Be it known that I, JOHN O. SHARPLESS, a citizen of the United States, and a resident of Fairhaven, in the county of Whatcom and State of Washington, have invented a new and Improved Fish-Trap, of which the following is a full, clear, and exact description.

This invention relates to a peculiarly-constructed floating fish-trap adapted to be set in a body of water and furnished with a lead to cause the fish to enter the trap.

This specification is the disclosure of one form of my invention, while the claims define the actual scope thereof.
Reference is to be had to the accompanying drawings, forming a part of this specification, in which similar characters of reference indicate corresponding parts in all the views.

Figure 1 is a perspective view of a trap with a part of the lead broken away. Fig. 2 is a plan view of the same. Fig. 3 is a longitudinal section taken through the trap, and Fig. 4 is a fragmentary perspective view showing the lead adjusted oppositely to the position shown in Figs. 1 and 2.

The trap comprises a pot or crib A, to the inner end of which is directly contiguous a heart B, the heart B in turn communicating with a hook C. From an opening in one wall of the hook C extends the lead D.

The pot or crib A is constructed of a framing 10, on which is stretched the netting, which forms the bottom and sides of the pot or crib, the top thereof being open. The frame 10 is constructed of tubes joined to and communicating with each other and sealed to form a buoyant structure capable of floating in the water to sustain itself and the parts attached thereto. The corner-posts of the frame are extended up above the sides and ends thereof and above the water-line, as shown, so that netting may be attached thereto to prevent the fish from jumping out of the pot. The upper ends of these corner-posts are open or may be provided with stoppers for closing them, as desired. A pump may be provided for pumping water into and out of the tubes forming the frame 10, by which to ballast the frame and regulate the depth to which it is sunk in the water. Situated in the pot A and opening into the same is a tunnel 11, the mouth of which is located at the inner end of the pot and is fastened at its bottom and sides to the bottom and sides of the pot. The tunnel 11 tapers longitudinally, and the inner or discharge end thereof is held in distended position by lines 12, fastened to the outer end of the pot, as shown.

The heart B has its framing formed by an extension of the framing of the pot A, and this heart has an inner wall 14, which is extended from the bottom up near the top of the trap. From the upper end of this wall 14 extends an apron 15, which projects into the heart B, as best indicated in Fig. 3.

The outer inclosure or hook C is not provided with a rigid framing, such as the frame 10 of the body, but has its bottom 16 and its sides 17 formed of netting joined together as shown and sustained at the proper elevation in the water by floats 18. The inner portion of the bottom 16 of the hook C has an upwardly-inclined extension 16ª, which leads to the upper edge of the wall 14 and of which the apron 15 is a continuation, so that the fish entering the hook C are caused to swim up the extension 16ª over the apron 15 and into the heart B, from which they pass through the tunnel 11 to the pot A, from which they may be taken at leisure. One wall of the hook C has a portion broken out directly adjacent to the side edge of the extension 16ª, as indicated at 19. This broken-out portion extends from the adjacent edge of the extension 16ª of the bottom 16 upward to the top of the hook C, the side portion of the hook below the extension 16ª being left intact, as shown. To this broken-out portion 19 the lead D extends, the lead comprising a net 20 and floats 21 at the top edge thereof. The upper portion of the inner end of the lead D is fastened to a part of the framing 22 of the hook at the top edge thereof, so as to be capable of moving from the position shown in Fig. 1 to that shown in Fig. 4. The lower edge of the lead D at its inner end is fastened permanently to the hook C at the lower end of the extension 16ª. When the lead is disposed as shown in Fig. 1, the trap is set for fishing with a current moving in the direction of the arrow shown in Fig. 1, and when the lead D is disposed as in Fig. 4 the trap is set for fishing with the current moving in the direction of the arrow shown in such figure. In other words, it is assumed that the fish move with the current, and it will be seen that the trap may be changed as the tide changes, thus permitting the trap to be used at all times. In this connection it is explained that the lead D is entirely flexible and may therefore accommodate itself to the movements described.

The main portion of the trap, comprising the parts A, B, and C, is held in place by anchor-cables 23, attached in any suitable manner, according to the conditions attending the use of the trap. The lower edge of the lead D has a number of adjustable anchor-cables 24 connected therewith, so that by changing these cables the lead may be held in the position shown in Fig. 1 or in that shown in Fig. 4, according to the condition of the tides and currents. Assuming that the trap is set as shown in Fig. 1, the fish move in the direction of the arrow against the lead D, which it should be understood is extended out from the trap a distance sufficient to span the stream or other body of water in which the trap is set. Then the fish are forced to pass through the opening 19 into the hook C and upon finding themselves inclosed therein will swim up the incline 16$^a$ and over the apron 15$^a$. When this apron is passed, the fish will naturally descend to that depth of the water which they usually occupy, thus approaching the bottom of the heart B. Then in endeavoring to find an escape they will pass through the tunnel 11 and rise to the surface of the water in the pot A, where they will be effectually trapped.

Having thus described my invention, I claim as new and desire to secure by Letters Patent—

1. A fish-trap having two compartments, an inclined bottom leading from the bottom of one compartment to the upper portion of the other, and an apron extending into said other compartment and forming an extension of the said inclined bottom.

2. A fish-trap, having a heart with an end wall extending up to near the top thereof, an apron extending into the heart from the upper edge of said wall, a hook, and an inclined bottom on the same, the bottom leading up to the upper edge of the said wall of the heart.

3. A fish-trap, comprising a pot, a heart situated at one side thereof, a tunnel leading from the heart to the pot, an inner side wall for the heart, the wall extending up to near the top thereof, an apron extending inward from said wall, a hook or outer inclosure adjacent to the heart and having an inclined bottom leading up to the said apron, and a lead extending to the hook or outer inclosure, to direct the fish thereinto.

4. A fish-trap, having a lead connected therewith, the upper portions of such connection being slidable, floats connected with the upper edge of the lead, and means for anchoring the lower edges of the lead, such means being adjustable, for the purpose described.

5. A fish-trap, comprising a heart, a hook or outer inclosure contiguous thereto, a wall between the heart and hook, the wall extending upward to near the top of the trap, an apron extending into the heart from the upper edge of such wall, and an inclined bottom extending from the hook upwardly to the upper edge of the said wall.

6. A fish-trap, having a lead fastened thereto at the lower part of one end, the upper part of said end being slidably connected with the trap, so that the sidewise inclination of the lead may be varied for the purpose specified, and means for holding the lead in the desired position.

7. A fish-trap, having a framing comprising side and bottom walls formed of metallic pipes, certain of which are open at their upper portions, and netting or the like carried on the frame.

In testimony whereof I have signed my name to this specification in the presence of two subscribing witnesses.

JOHN O. SHARPLESS.

Witnesses:
 B. W. BENSON,
 J. E. WALSH.